April 10, 1956 R. M. M. OBERMAN 2,741,663

AUTOMATIC SWITCHING SYSTEM

Filed June 7, 1951 5 Sheets-Sheet 1

INVENTOR:
R. M. M. OBERMAN.
BY Hugh A. Kirk
ATTY.

April 10, 1956 R. M. M. OBERMAN 2,741,663

AUTOMATIC SWITCHING SYSTEM

Filed June 7, 1951 5 Sheets-Sheet 2

INVENTOR:
R. M. M. OBERMAN.
BY Hugh A. Kirk
ATTY.

INVENTOR:
R. M. M. OBERMAN.
BY Hugh A Kirk
ATTY.

INVENTOR:
R. M. M. OBERMAN.
BY Hugh A. Kirk
ATTY.

April 10, 1956 R. M. M. OBERMAN 2,741,663

AUTOMATIC SWITCHING SYSTEM

Filed June 7, 1951 5 Sheets-Sheet 5

INVENTOR:
R. M. M. OBERMAN.
BY Hugh A. Kirk
ATTY.

United States Patent Office 2,741,663

Patented Apr. 10, 1956

2,741,663

AUTOMATIC SWITCHING SYSTEM

Roelof Maarten Marie Oberman, The Hague, Netherlands, assignor to De Staat der Nederlanden, Ten Deze Vertegenwoordigd Door de Directeur-Generaal der Posterijen, Telegraphie en Telefonie, The Hague, Netherlands Application June 7, 1951, Serial No. 230,277

22 Claims. (Cl. 179—18)

This invention relates to an automatic switching system for telephony, telegraphy and the like. More particularly, it deals with the switching system for preselecting a given one of a plurality of lines leading from an exchange to a subscriber, such as by means of successive groups of selectors.

In many previously known switching systems, the occurrence of many non-available switching paths cannot be avoided due to the directional selection of the group selectors of such a system. This results in traffic restrictions and can only be overcome by divided multiple fields, such as grading or slipping connections for groups of selector switches and/or expensive selectors having many outlets, such as cross-bar and panel selectors.

It is an object of this invention to produce a simple, economic, efficient and effective automatic switching system whereby a greater number of calls can be made through a given number of selectors, or the reduction in the number of intermediate selectors can be accomplished.

Another object is to provide an automatic switching selecting system wherein a free path through a series of group selectors is predetermined for each subscriber's line being called.

Another object is to provide an automatic switching selecting system in which each final selector may be reached through any fully available groups of lines.

Another object is to provide a selector circuit provided with a plurality of incoming intermediate and final selectors in which the number of intermediate selectors is equal to the number of incoming selectors and much smaller than the number of final selectors, whereby for example, in the case of weak traffic condition a multiple group of seven final selectors per 100 connections is sufficient.

Another object is to provide a switching system comprising a plurality of selectors for selecting final selectors in which the problems of grading and slipping are not encountered.

Another object is to provide a controller circuit which bridges the incoming and intermediate selecting stages of a three stage selector switching system for routing the calls through available incoming and intermediate selectors which have access to an idle and desired final selector.

Another object of this invention is to provide such controller circuits for a selecting system which may operate simultaneously to complete several connections.

Another object is to provide a switching system comprising a plurality of stages of selectors having free outlets to provide for extensions and reserves.

Another object is to provide a switching system which offers a great freedom of action with regard to the extension of the system, giving a maximum of facilities with a minimum number of selectors.

Generally speaking, the system of this invention comprises at least three separate selecting stages each of which is provided with groups of selector switches. All of the selector switches of each group are provided with wipers and contact banks. The selectors of each stage are divided into groups of multipled selectors, and the contact bank of each preceding selector is trunked out to the inputs or wipers of each of the succeeding selectors in the following selecting stage. Thus, the multipled contact banks of the selectors in any one stage are divided to correspond to the number of selectors in the following selecting stage. In addition to this connection, there is also provided a controller circuit connected between the incoming selector stage and the final selecting stage, which hunts for a free path through the selecting stages of the switching system. This is accomplished by providing a routing selector in the controller circuit responsive to those digits of the called number prior to the digits for positioning the final selector, which first seeks out the particular final selector groups and then sets up the preceding selecting stages corresponding to the first digits of the number called. This is accomplished by testing each of the final selectors of the group selected to find which one is free, and then connecting thereto those preceding selectors having access to that free final selector. Thus, numerical selection through the controlling circuit precedes hunting of the proper circuit through the switching system, so that the incoming selector picks an intermediate selector known beforehand to be free and available for through connection to the preselected final selector. Accordingly, the controller circuit cooperating with the incoming and intermediate selector stages enables these selectors together to act as a large capacity group selector.

Thus, according to the present invention, any incoming junction may be connected to any intermediate selector group and to any outgoing junction. As a consequence, for example, the incoming selecting stage of selectors with 100 outlets and the intermediate selecting stage of selectors with 100 outlets are equivalent to a single group selector stage in which each selector has 10,000 outlets.

The controller circuit may be included in each register circuit of the system and comprises relays, contacts, connections, rectifiers or batteries, etc. that are connected to the wipers of the selectors of both the intermediate and the final selecting stages, and through a cord finder type of selector switch for selecting cord or connecting circuits to the input wipers of the selectors of the incoming selecting stage, as well as means for testing which lines in the final selectors are busy. There also may be included switching devices in the controller circuit which may be connected to the trunk lines connecting the wipers of the selectors of the intermediate selecting stage, as well as the final selecting stage of the switching system.

If the final selectors were under the influence of the controller circuit without testing the incoming side of the final selector as in the case of a cross-bar system, the effect of this invention would become impossible. Therefore, in the cross-bar system, selection is effected non-numerically in all selecting stages so that the controller circuit has a much more complicated function to perform. This gives rise to restrictions in the number of controller circuits in use simultaneously, which restrictions originate from switching considerations as well as being of an economic nature. These restrictions do not exist in the system according to the present invention. An exchange according to the present invention is provided with the full number of controller circuits required by the probability computation, and these controller circuits are capable of operating simultaneously for the completion of several connections.

The above mentioned and other features and objects of this invention and the manner of attaining them are given more specific disclosure in the following description of embodiments of the invention taken in conjunction with the accompanying drawings, wherein.

Figure 1:
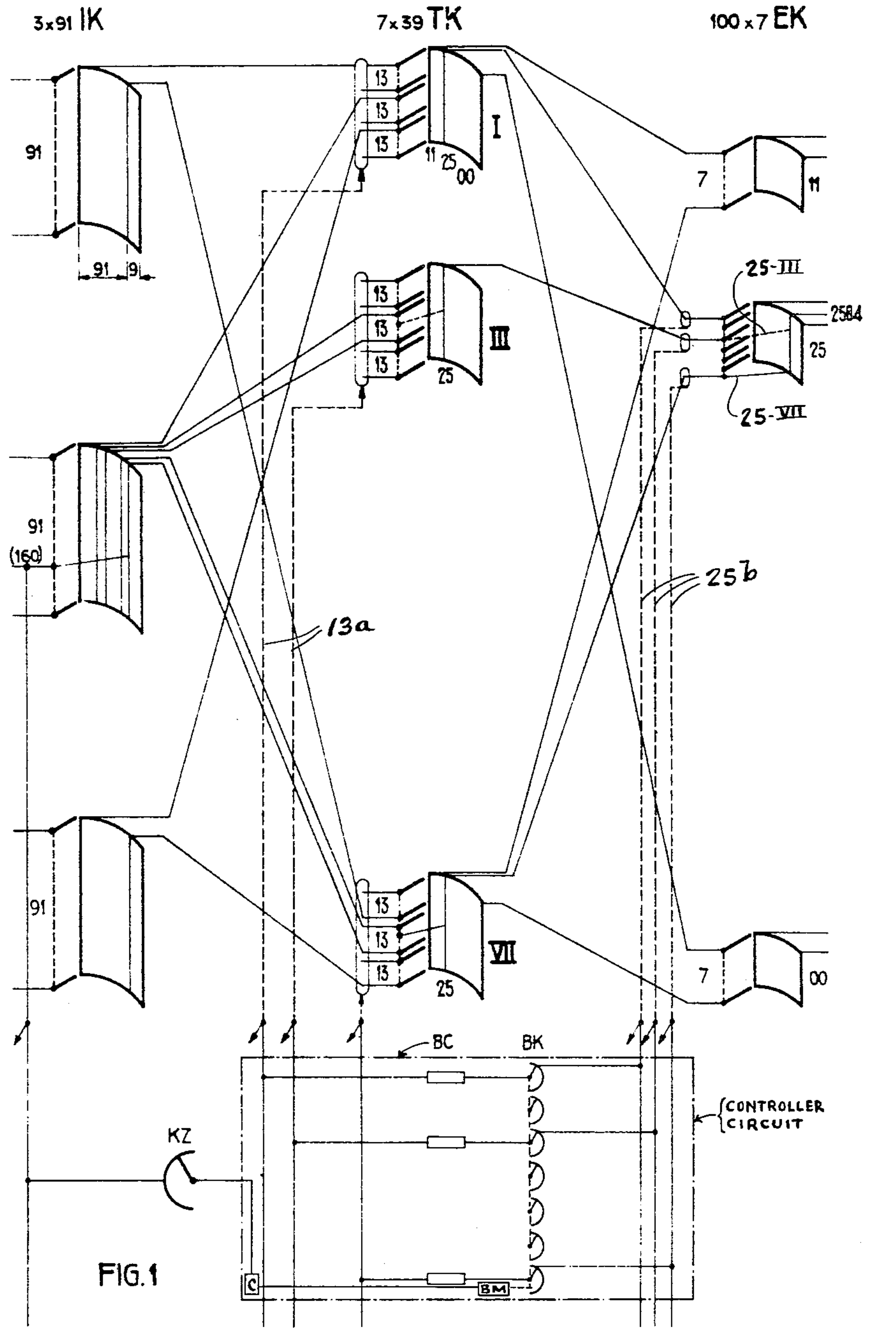
Fig. 1 is a schematic wiring diagram of a switching system according to the invention for an exchange with light traffic and a maximum of 10,000 lines.
Figure 2:
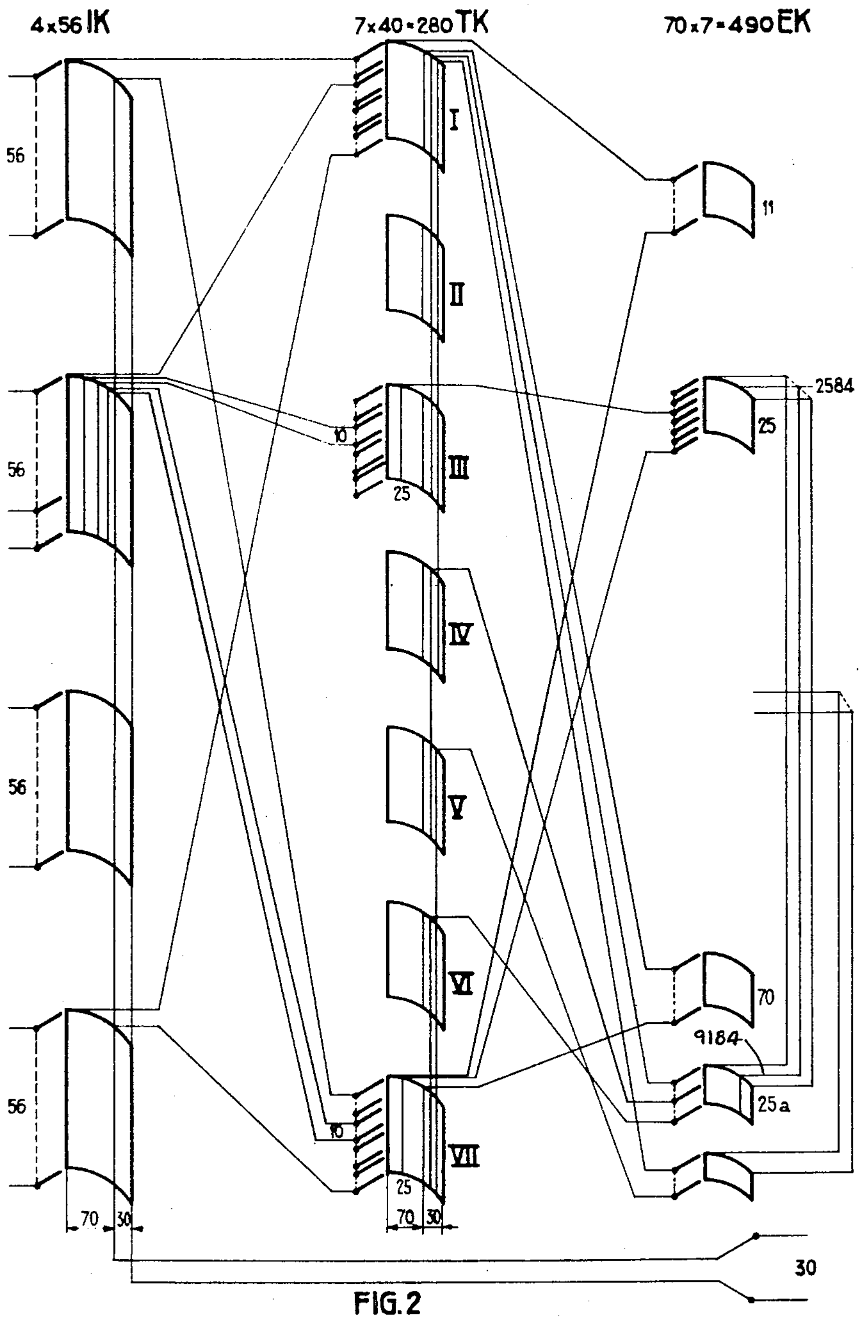
Fig. 2 is a schematic wiring diagram of the selecting stages of a switching system for a maximum of 7,000 lines adapted for heavy traffic over certain lines.
Figure 4:
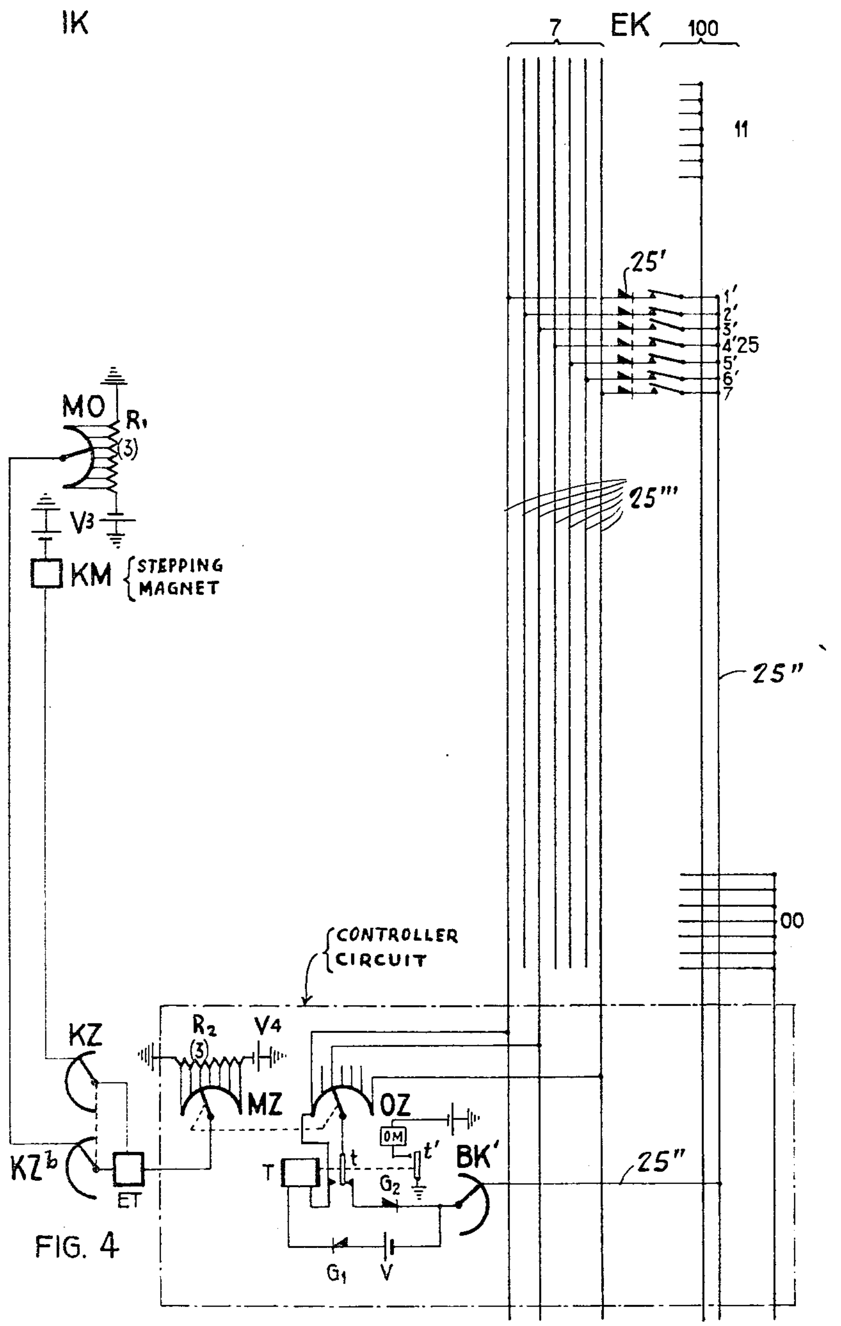
Figure 5:
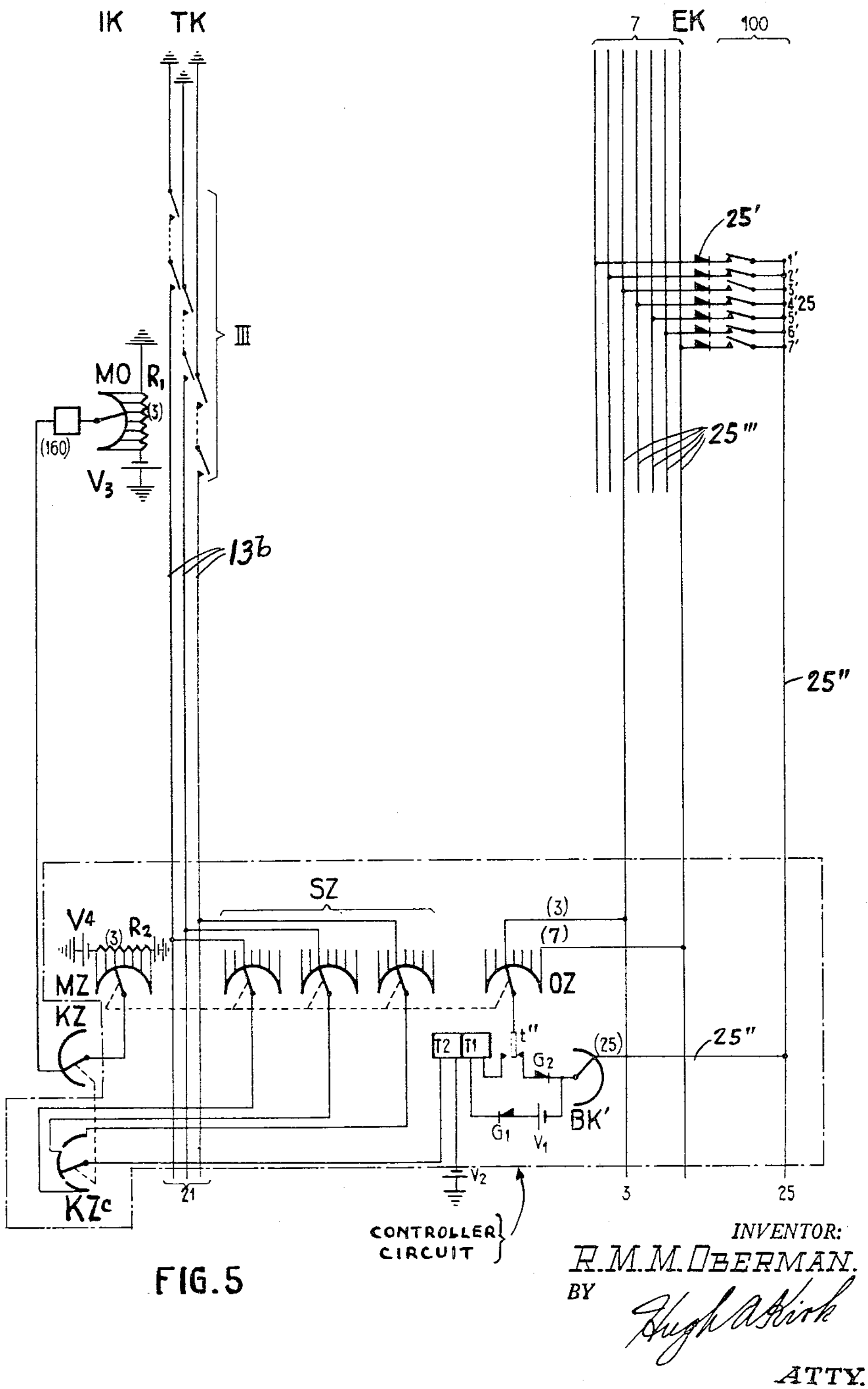

Fig. 4 is a schematic wiring diagram of another embodiment of a controller circuit and its connections, which may be adapted to a circuit similar to that shown in Fig. 1 or 2 of this invention; and Fig. 5 is third and preferred embodiment of a controller circuit and its connections through a switching system, also which may be adapted to a circuit similar to that shown in Fig. 1 or 2 of this invention.

Figure 3:
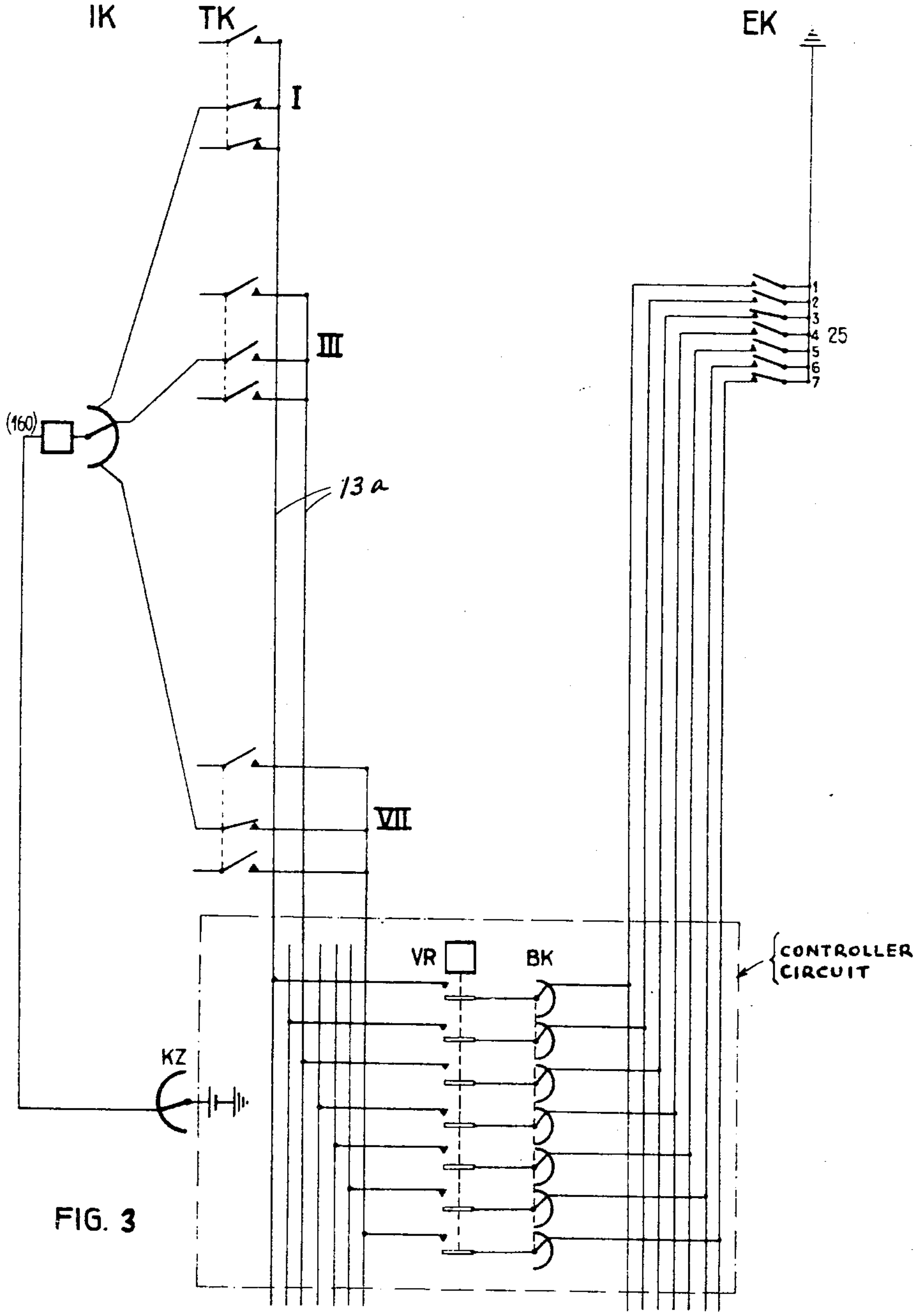
Fig. 3 is a schematic wiring diagram of one embodiment of a controller circuit for a switching system according to Fig. 1 of this invention.

In Figs. 1 and 2 a switching system has been disclosed as comprising a plurality of selecting stages, namely an incoming selecting stage IK of groups of separate selectors, an intermediate selecting stage TK of groups of separate selectors, and a final selecting stage EK of groups of separate selectors. The banks of contacts of three or more of the groups of selectors of each stage are shown in perspective as arcuate surfaces, and the separate selector wipers are shown as arms which sweep over the vertically multipled contacts that lie in these surfaces of each group. All of the interconnecting lines and contacts are not shown for the reason of clarity, but only the first and last group of contacts of each of the selectors are connected to the corresponding wipers by lines in these circuits. The controller circuit which is one of the principal features of this invention, is shown in Figs. 1, 3, 4 and 5 within a dot-dash lined rectangle. Any one of these controller circuits may be interchanged with any one of the other circuits shown, to form different embodiments within the scope of this invention. Only those parts for each controller circuit which differ from that shown in Fig. 1 are shown in Figs. 3, 4 and 5; that is, the register circuits and control devices C and BM in Fig. 1, which include the controls for the stepping magnets for operating the selector switches both in the control circuit BC itself and in the selecting stages, are not repeated in Figs. 2, 3, 4 and 5, since such circuits and control devices are conventional and not a part of the inventive feature of this system.

I. THE SWITCHING SYSTEM IN GENERAL

Referring to Fig. 1, it is assumed for the purpose of illustration that the final selectors EK, each have a hundred outlets and are multipled in groups of seven, so that for a 10,000 line exchange there are 100 groups of seven final selectors, three of which groups, namely 11, 25 and 00 are shown in Fig. 1. These selectors provide connections 1111 to 0000. In the case of a light traffic exchange, about 270 cord circuits through the switching system shown in Fig. 1 would be sufficient, so according to the present embodiment there are shown 3×7×13 or 273 cord circuits which are connected from the incoming selectors IK through the intermediate selectors TK to the final selectors (each of these selectors also having 100 outlets). The intermediate selectors TK are herein multipled in seven groups I, II, III, IV, V, VI and VII, of which three, viz. I, III, and VII are shown. The number of groups of intermediate selectors accordingly should correspond to the number of selectors in each group of final selectors, which is seven, and each vertical series of multipled contacts of the intermediate selectors TK of each group are correspondingly connected to one selector of each group of final selectors EK. Since the number of intermediate selectors TK should equal the number of incoming selectors IK, that is 273, each group of intermediate selectors TK comprises $$\frac{273}{7}=39$$

separate selectors each having 100 outlets, which separate selectors are divided in each of the I–VII groups TK into three sub-groups of thirteen selectors each.

The 100 outlets of the incoming selectors IK are divided among the seven groups I–VII of the intermediate selectors TK, so that $$\frac{100}{7}=13+$$

or 13 links to each sub-group of the seven groups of intermediate selectors. There may be three separate groups of incoming selectors IK, of which each selector in each group has 100 outlet contacts, and each group of which may comprise 91 separate selectors, namely 7×13; and the three groups of 91 selectors being 3×91=273, providing the number of originally required cord circuits which are connected to the wipers of the incoming selectors IK. The banks of the 100 contacts of each of the incoming selectors, however, are divided among the intermediate selectors in such a way that 7×13=91, or only 91 of the 100 contact points of each selector are employed, thus leaving 9 extra contacts on each incoming selector for reserve purposes as will be described later. In this particular arrangement a division of selectors between the incoming and intermediate selectors is such that the first sub-group of 13 of each of the seven intermediate selectors, is successively connected to the vertical rows of 1 through 13 contacts of the first incoming selector IK; while the second sub-group of 13 selectors of each of the seven intermediate selectors are connected to the vertical rows 1–13 contacts of the second incoming selector IK; and similarly for the third sub-group of 13 to the third incoming selector. Thus, each of the 91 contacts of each incoming selector are multipled to separate groups of wipers on each of the seven intermediate selectors TK.

The numerical division of the selectors between the incoming and intermediate selectors, however, may be adapted for different types of selector switches. If the use of 13 links per group is difficult, such as in the case of a two motion selector of 10×10, the size of the link groups can be reduced to 9 or 10 links by dividing the incoming selecting stage into four groups of about 68 incoming selectors each, but then 7×10=70, or only 70 of the 100 outlets of each of the incoming selectors are used. This provides an additional plurality of reserve contacts on the incoming selectors, which will be described later in the description of Fig. 2, and is advantageous for circuits having heavy traffic.

1. *A light traffic system*

Let it be assumed that the 160th cord circuit has been seized by a call for a subscriber's number "2584," for which there is a corresponding line from the final selector group 25 as shown at 2584 in Fig. 1. This connection must be reached through one of the seven selectors of the final selector group 25, each one of which selectors is connected to a different intermediate selector TK. The problem now is: which of the intermediate selectors TK is the one which is to be chosen? This problem is solved by the controller circuit BC shown in the dot-dash rectangle at the bottom of Fig. 1, and which may be replaced by any one of the similar controller circuits in dot-dash rectangles shown in Figs. 3–5 described later. However, for the purpose of a quick description of operation of Fig. 1, it will only be considered that the present controller circuit comprises a routing selector BK, and additional means not shown in the circuit BC for the control of this routing selector. As shown in Fig. 1, the seven contact banks of 100 outlets each from the routing selector BK are multipled to each of the inputs of the final selectors, so that each outlet corresponds to one group of final selectors EK and each contact bank of switch BK corresponds to one of the seven final selectors of each group EK via a connection **25*b*. Also each controller circuit BC is multipled through a cord finder KZ to the inputs of each of the incoming selectors IK, including the particular circuit to the wiper contact cord circuit 160**.

According to the operation of this system, as soon as the cord finder KZ has found the calling subscriber's cord circuit 160, a dialing tone is sent to the calling subscriber, or if a trunk call is concerned a signal is given that the controller circuit BC is ready to receive the required information. Subsequently, the first two digits "2" and "5" of this particular number "2584" being called, are successively sent over the cord circuit 160 to the controller circuit BC and the routing selector BK is moved to its 25th position, which motion is under the control of a register circuit C connected to one of the contact banks of the cord finder switch KZ and the stepping magnet BM of the selector BK. This operation of the routing selector BK is done either directly or through a register circuit. Appropriate means is provided in the controller circuit BC of Fig. 1, as will be described later in the controller circuits of Figs. 3, 4 and 5, so that a busy or idle condition of each of the seven final selectors of the group "25" is ascertained via the route finding conductors 25*b*.

Let us assume that the third and seventh final selectors of the group 25, namely 25–III and 25–VII are idle. The controller circuit BC thus has the task of starting the incoming selector IK to which the cord circuit 160 is connected, to let it hunt over the link groups running from the multipled contact banks of the middle incoming selector group to the wipers of the middle sub-groups of 13 in the 3rd and 7th groups of the intermediate selectors TK, in order to seize an idle intermediate selector therefrom. Any intermediate selector that can be seized under these conditions is capable of completing the connection by simply occupying position "25" since each such intermediate selector is linked up with the 25–IIIrd or the 25–VIIth final selector. The final selector itself can then be positioned in accordance with the last two digits "84" of the called subscriber's number, either directly via the connections set up through the circuit of the incoming and intermediate selectors as controlled by the controller circuit, or by means of a register circuit if a complete register is employed.

If the incoming selectors IK have contact banks with 100 contacts in uninterrupted sequence, so that the groups of 13 links as shown in Fig. 1 can be employed, the controller circuit BC can control the incoming selector in a simple manner. For this purpose all of the intermediate selectors may be provided with special busy indicating or routing contacts in each of the input circuits of the intermediate selectors, which circuits are indicated by the dotted lines 13*a* multipled to all 39 of the selectors of each of the seven intermediate selector groups and then connected to the seven inputs or wipers, respectively, of the routing selector BK in the controller circuit BC. The conductors 13*a*, energized through the routing selector BK, correspond with the final selectors in the desired final selector group which are free and available, thus permitting the incoming selector for the chosen cord circuit (160) to pass over all of the occupied intermediate selector groups of contacts in its bank and only test for free selectors in the group or groups of intermediate selectors through which a connection can be made to the desired final selectors, namely intermediate selector groups TK–III and TK–VII corresponding to the above assumed free final selectors 25–III and 25–VII. If all 39 of the intermediate selectors in group TK–III are occupied, then the incoming selector 160 will move on immediately to test group TK–VII, without being delayed by testing any of the contacts corresponding to the selectors in groups TK–I, II, IV, V and VI. This operation will be described later in more detail in connection with Figs. 3, 4 and 5.

There may be difficulty when more than one controller circuit BC is simultaneously operated. However, this condition is overcome by the employment of a switching path finder SZ as shown in Fig. 5 and which will be described later. This switching path finder imitates momentarily the incoming selector and determines the position the latter should take.

2. *A heavy traffic system*

If the incoming selectors IK are for instance two-motion selectors, the 1st, 2nd, 4th, 5th and 6th level should be made inaccessible during the vertical hunting movement according to the specific example described in the chapter I(1) above; and in the case the 3rd level too should be inaccessible, the selector need not be unnecessarily hunt over it either. A corresponding explanation applies to selectors in which the selection of one of a plurality of different levels is affected by a trip spindle as in rotary selector switches (see page 266, vol. 3 of "Telephone Theory and Practice," Automatic Switching and Auxiliary Equipment by Kempster B. Miller, published by McGraw Hill & Co., 1933).

Thus according to Fig. 2, for heavy traffic the incoming selecting stage IK is shown divided into four groups of fifty-six 100-contact selectors and the intermediate selecting stage TK is divided into seven groups of forty 100-contact selectors. This greater number of intermediate selectors TK ($7\times40=280$) than of incoming selectors IK ($4\times56=224$) diminishes the chances for internal blocking. In this embodiment only the first 70 of the 100 contacts of each selector of the incoming and intermediate selectors are employed, so that an extra 30 contacts on each selector are available for reserve, such as for heavy traffic conditions. However, the circuit shown in Fig. 2 is only for 7000 subscribers, in that only 70 separate final selector groups EK, each having 7 selectors, are employed. The intermediate seven groups of selectors TK are accordingly divided into four sub-groups of ten selectors, and each said sub-group of ten selectors corresponds to a level or group of ten outlets of each multipled group of the incoming selectors. Thus the first seventy outlets of the incoming selectors may comprise the first seven levels of two-motion selectors, and may be provided for local traffic for which there are 280 intermediate selectors available. The chance for internal blocking in this portion of the circuit is extremely small in view of the fact that if 223 incoming selectors are already engaged, the 224th calling subscriber still finds $70-55=15$ free and available links in his group of 56 incoming selectors.

In connection with the known literature about internal blocking in link systems, it is easy to show that the internal blocking in the embodiments of this invention is negligibly small with respect to the external blocking. If necessary all of the 100 positions of the incoming selectors shown in Figs. 1 and 2 can be used instead of only the 91 and 70 shown, respectively, so that $$\frac{300}{7}$$

or about 43 intermediate selectors would be in one group of the system of Fig. 1, and $$\frac{400}{7}$$

or about 57 intermediate selectors in one group of the system of Fig. 2. If the occurrence of groups of heavy traffic subscribers is to be expected when composing an exchange, without knowledge beforehand of the subscribers belonging to such groups, space must be left in each bay of conventional systems for mounting reserve final selectors in each final selector group. In the system according to the present invention, however, all the bays can be arranged for seven final selectors, and all reserves may be located in separate bays. Accordingly, the reserve possibility for extremely heavy traffic groups is fundamentally unlimited.

The 8th, 9th and 10th or 0th levels of the incoming selectors IK of Fig. 2 are utilized for other reserve purposes. For example, levels 8, 9 and 10 may be divided as follows: levels 8 and 9 (multipled over all of the incoming selectors) may be connected directly to 20 final selectors bound for extremely heavy traffic groups, and level 10 (or 0) may be for trunk lines and special services up to 10 lines.

Since there are only 7000 final outlets to the 70 different groups of final selectors, the numbers 8111 and upward to 0000 from the intermediate selectors TK (assuming that they are 10 by 10 two-motion selectors) have three reserve levels. Accordingly, the intermediate selectors TK with the additional 30 contacts on each selector available as reserve, could be divided as follows: level 8 may be used for extension of the exchange, that is, subscribers numbers 8111 to 8000; level 9 for heavy traffic groups for which up to 70 final selectors can be provided in additional bays; and level 10 (or 0) for up to 70 trunk lines.

The additional group of final selectors 25*a*, and the other groups shown in the lower part of the final selector stage EK of Fig. 2, may be provided for heavy traffic conditions, and may be multipled to those particular selectors for which heavy traffic is to be handled. A routing selector may have, for one or each heavy traffic reserve group, a reserve position, such as for the final selector group 25*a* shown in Fig. 2, which is seized in the case that the normal final selector group 25 is found completely busied. The incoming selector subsequently derives from the reserve position of such a routing selector in its corresponding controller circuit described above, the command to hunt for reserve links connected to the reserve group 25*a* (groups 25 and 25*a* being connected in multiple as shown in Fig. 2) so that the calling subscriber will reach number "2584," as though he had dialed a number, such as for example "9184."

Another possibility is to use reserve links for trunk traffic. In this case, at least one of the numbered positions, that is "0" for example of a routing selector in a controller circuit, must be reserved for this purpose, and consequently at least one of the 100 final selector groups for local traffic should be omitted. If "0" is chosen, the controller circuit directs the incoming selector, without the intervention of the intermediate selecting stage, immediately to the trunk circuit. This method, however, is not recommended since by abandoning a final selector group for local traffic, a position falls open in each of the intermediate selectors. On the other hand, by including the trunk traffic selectors together with these selectors, trunk circuits can be connected without withdrawing the reserve of the incoming selectors from the blocking chance reduction and/or the completion of the heavy traffic group, because the present system has been designed to take care of such trunk circuits.

It may seem more rational to serve all the heavy traffic groups via the intermediate selector reserves and to derive the trunk and special circuits directly from the incoming selector, but this depends on the numbers, wants and requirements for the system. Nevertheless, the combinations of multipling the incoming and intermediate selectors as shown in Fig. 2 illustrates the great number of degrees of freedom of action and extension of a system according to the present invention which can attend to a maximum of facilities with a minimum number of selectors.

II. THE CONTROLLER CIRCUITS

1. *A directly controlled controller circuit*

One of the simplest, although not a preferred controller circuit, is shown in Fig. 3 within the dot-dash lined rectangle. In this figure there are shown connected to each one of the seven busy indicating contacts 1–7 of the final selector group 25, separate routing contacts of the routing selector BK, in which the contacts 3 and 7, corresponding to the unoccupied final selectors previously described in the example for Fig. 1, are shown to be closed to ground. Thus, when the routing selector BK in the controller circuit has reached its position "25" corresponding to the first two digits of the number to be routed through the circuit of Fig. 1, wiper contacts 3 and 7 of BK are grounded through the corresponding busy indicating contacts 3 and 7 previously mentioned. When the sequence relay VR, shown in the controller circuit, is energized, the conductors 3 and 7 are connected to the intermediate selector groups III and VII, and the incoming selector IK finds ground potentials on groups III and VII. In Fig. 3 there is also shown for group I of the intermediate selectors TK, a closed routing contact connected by one of the trunk lines 13*a* through the controller circuit, but the routing conductor connected to it is not grounded by the corresponding closure of the busy indicating contact 1 of the final selector 25, so that the incoming selector is not stopped at group TK–I. Thus, as the incoming selector searches over the intermediate selectors TK it can only be stopped at the intermediate selector groups III and VII if one of their selectors has a closed routing contact to complete a circuit to ground. Accordingly, since all of the routing contacts of the intermediate selectors of group TK–III are shown to be open, the incoming selector for cord circuit 160 only stops at intermediate selector group TK–VII.

In this embodiment only one controller circuit can be set into operation at the time for controlling an incoming selector. This is effected by means of the sequence relays VR of all the controller circuits present so that only one relay VR can be energized at a time. The dependent means for this control may comprise, for example, a testing relay which after positioning the routing selector BK tests whether or not there are routing selectors in the other controller circuits of other registers testing a routing at that time, and if not, the sequence relay VR of the involved control circuit is operated. The positioning of the cord finder KZ, and the routing selector BK, shown in Fig. 3, is effected independently of the other controller circuits of the system, and therefore these switches may be preset awaiting their turn for the operation of their sequence relay VR.

2. *A balanced controlled controller circuit*

Another development of the controller circuit is shown in Fig. 4 in which a smaller routing selector may be employed than selector BK shown in Figs. 1 and 3, namely the selector BK′ which has only one contact bank or row of 100 contacts instead of 7 contact banks or rows of 100 contacts as selector BK. The controller circuit of this embodiment is based upon an open instead of a closed circuit condition of the busy indicating contacts 1′–7′ of any one of the final selector groups, for example, final selector group 25. Thus, when the routing selector of BK′ has arrived at the position 25 corresponding to the first two digits of the number being called as described in the example of Fig. 1, a circuit is completed through a conductor 25″ which is connected in parallel to all of the input contacts to final selectors of group 25. This controller circuit shown in Fig. 4 also discloses an additional searching switch OZ which is connected through a contact *t* to the wiper of the routing selector BK′. The searching switch is provided with seven contacts, one corresponding to each selector of the separate seven selectors of each group of final selectors EK, and each of these seven contacts is multipled via conductors 25‴ to a corresponding input of one final selector in each group. This selector OZ continuously steps over its contacts, until an open contact is found, which (as shown in Fig. 3) corresponds to the contacts 3′ and 7′ of the final selector 25. Therefore, the test relay T is energized preferably via a home contact of OZ before OZ starts into operation stepping around its other seven contacts. As long as OZ finds a closed busy indicating contact it continues to step, and relay T remains energized through the battery V by means of the following circuit; winding of relay T, front contacts *t*, wiper OZ, a search conductor 25‴, one of the rectifiers 25′ at the inputs to the selectors of group 25, a corresponding closed contacts 1'–7' of final selector 25, routing conductor 25'', wiper BK', battery V (a separate one for each controller circuit), rectifier G1 and back to winding T. In position 3 the searching switch OZ finds busy indicating contact 3' in the final selector group 25 open, so that the test relay T now releases and interrupts the circuit to stop switch OZ from stepping by deenergizing the power magnet OM connected through another contact *t'* of relay T. Via the back contact of armature *t* the final selector 25–3', which has just been found to be free, is now provisionally busied, since armature *t* is connected in parallel to the routing contact 3' of group 25, so that another controller circuit of the system hunting over the group 25 will find contact 3' already busied, which indication is held until a connection to its corresponding final selector is completed.

When the searching switch OZ occupies its third position (3) the marking switch MZ has also reached its third position (3) since their two wipers are coupled together as shown by the dotted line in Fig. 3. All the contacts of the marking switch MZ may be provided with different comparison voltages according to the taps of the potentiometer R2 supplied with voltage from a battery V4. These comparison voltages correspond with the comparison voltages of the marking outlets MO, which are a part of the incoming selector IK. Thus, the incoming selector will be stepped according to the marking outlets MO to its third position (3), under the control of the controller circuit and its marking switch MZ. The voltages of the marking switches MZ and MO derived from potentiometers R1 and R2 through similar voltage sources V3 and V4, respectively, are compared in a Wheatstone bridge circuit which is formed by the connection from the wiper MZ to the wiper MO through an auxiliary arc of contacts KZ*b* of the cord finder KZ. In this connection a testing device ET has been inserted which operates until a voltage balance is obtained, so that it then can stop the incoming selector by stopping its stepping magnet KM at the group corresponding to position (3). The incoming selector is then started again to find the idle link in the corresponding group III of intermediate selectors (not shown in Fig. 4). These two selective motions may be combined when all the idle intermediate selectors of group III are marked by the same marking voltage (3).

In this embodiment, all the controller circuits can operate simultaneously. However, when the link group connecting the incoming selector to intermediate selector group III is busy, then the searching switch OZ in the controller circuit must be started once more in order to make another attempt to find a free connection via another final selector, namely, the final selector corresponding with routing contact 7' or 25–7', which is the other busy indicating contact opened as shown in Fig. 4.

3. *A preselecting controlled controller circuit*

According to Fig. 5, the last mentioned difficulty of the controller circuit of Fig. 4 is removed by the application of a switching path finder SZ. This switching path finder imitates momentarily the incoming selector and determines the position the latter should take. The position of the incoming selector is then derived from the switching path finder by means of an independent controller device, such as for example: a Selsyn or servomotor, a bridging marking circuit, or switching method system according to a Wheatstone bridge principle similar to that described in Fig. 4.

According to the circuit in Fig. 5, the path finder SZ has three arcs or levels of seven contacts each, with three corresponding wipers, each connected to three groups of contacts on an auxiliary arc or bank of contacts KZ*c* of of the cord finder KZ. The wiper of contacts KZ*c* is connected to a second winding T2 of the testing relay for the searching switch OZ. The winding T2 of the testing relay may be energized by a battery V2, which may be common for all controller circuits, while a separate battery V1 for each controller circuit is connected to the routing switch BK'. The 3×7=21 contacts of the switching path finder SZ are connected to 21 testing conductors corresponding to the 21 link groups between the incoming selector IK and intermediate selectors TK in Fig. 1. Each testing conductor tests a whole link group, that is, all of the engaged sub-group of 13 intermediate selectors of a link group which have corresponding contacts connected in series in said conductor, as shown schematically for the conductors **13*b* in Fig. 5 for only a part of the contacts of the intermediate selector group TK–III. The last contact of each series of 21 conductors is grounded as shown at the upper end of the wires 13*b*** in Fig. 5. Consequently, if all of the intermediate selectors of a sub-group of 13 intermediate selectors are engaged, path finder SZ finds ground potential on the relevant testing conductor indicating that that particular sub-group of 13 selectors is occupied and another sub-group must be found.

The auxiliary arc of contacts KZ*c* of the cord finder KZ insures that the ground potential from all the occupied TK–III sub-group of selectors reaches the winding T2 of the testing relay, whereby the armature *t''* of which relay may remain as a consequence thereof in its forward position regardless of the open circuit through contact (3) of the searching switch OZ, operated as described in the previous chapter II–2 for Fig. 4. Accordingly, the searching switch OZ still continues to step on until it reaches its position (7) corresponding to final selector 25–7', which is also shown to have an open circuit in Figs. 4 and 5; it being the only other final selector which is available in the group 25. Thus, the stepping of the searching switch OZ is continued without first starting the incoming selector IK to test the position III and awaiting a failure, as is necessary in the previous embodiment described in connection with Fig. 4.

The incoming selector (160) may be started in the meantime without waiting for the stopping of the searching switch OZ under the control of the bridge marking switches MZ and MO, since the motion of MO must follow the movement of the marking switch MZ connected to the wiper of the searching finder OZ as well as the wipers of each of the three arcs of contacts of the path finder SZ (see connection indicated by a dotted line shown in Fig. 5).

Though the searching switch OZ, marking switch MZ, and the switching path finding switches SZ are represented as separate units, they will preferably be combined as a collective selector switch, with two levels as shown in Fig. 4, or with five or more levels as shown in Fig. 5. As such a selector switch OZ, SZ and MZ has only seven, or in a heavy traffic exchange a possible ten positions, it operates very rapidly after the positioning of the routing selector BK'. When employing a switching path finder SZ as shown in Fig. 5 it is possible to lay out completely, in the shortest possible time, the route to be followed through the exchange. As soon as this route is fixed the three groups of selectors, that is IK, TK and EK, can be put into operation simultaneously, which permits a material saving of time. The position of the incoming selector IK is entirely defined or determined by that of the marking switch MZ and the idle intermediate selector chosen from the indicating link groups. The intermediate selector TK derives its position "25" from the routing selector BK', or from a register on which the first two digits have been recorded. The final selector EK derives its position from a register on which the last two digits of the number called ("84") have been recorded.

III. MODIFICATIONS

It is even possible, by taking for the routing selector BK a high speed selector of the type directly controlled by the signalling impulses, to have this selector function itself as a register for the intermediate selecting stage, In this case the searching switch OZ has already indicated the final selector to be used before the ultimate digits arrive, so that the final selector 25 may be directly controlled. Such a circuit eliminates the necessity of a register.

Exchanges in which a five digit system is employed can operate according to the same diagram as that shown in Fig. 1, if three digits are handled in the first two selecting stages. This can, for example, be realized by means of the incoming and intermediate selectors having 200 outlets instead of 100 as shown, which 200 outlets are interconnected by five link groups together with the switching path finder according to the control circuits shown in Fig. 5.

If a six digit system is involved, or a seven digit system, such can easily be accounted for by repetition of the first two selecting stages. In the seven digit system, the first three digits will be handled by the first two selecting stages and the last four may be dealt with in a local exchange according to the circuits shown in Fig. 1 or Fig. 2.

In summary, any one of the controller circuits shown in the dot-dash lined rectangles in Figs. 3, 4 and 5, may be employed in place of the controller circuit BC shown in Fig. 1, to provide various increased automatic and rapid routing of the calls. Only those portions of the switching system circuit of Fig. 1 are duplicated in Figs. 3, 4 and 5 which are necessary to describe their corresponding controller circuits, the remaining part of said circuits being similar to that of Figs. 1 and/or 2 depending upon which modification of the circuit is employed, or to which it is adapted.

Thus, the system of the present invention has many advantages and enables an automatic switching exchange to take care of an increased number of calls with a relatively small number of selector switches, as well as being able to avoid the necessity of also providing register circuits which may be replaced at least in part by the particular controller circuit shown in Fig. 5 of this invention.

While there is described above the principles of this invention in connection with specific apparatus, it is to be clearly understood that this description is made only by way of example and not as a limitation to the scope of this invention.

While I have illustrated and described what I regard to be the preferred embodiment of my invention, nevertheless it will be understood that such is merely exemplary and that numerous modifications and re-arrangements may be made therein without departing from the essence of the invention, I claim:

1. In an impulse responsive switching system having at least three consecutive selecting stages, each of which stages has a plurality of groups of selector switches with each switch having an input and a plurality of outputs, and said system also having groups of conductors for connecting each input of each group of selector switches of a subsequent stage in multiple with some of the outputs of each group of the selector switches of a previous stage, the improvement comprising: a controller circuit connected to the inputs of the selector switches of the final of said consecutive selecting stages to preselect a free and available final selector to which a connection can be made through said previous stages of said system under the control of said controller circuit, said controller circuit being responsive to a plurality of impulses to set up a connection and including a routing selector responsive to the impulses preceding the ones used for setting the final selector and corresponding to a desired final selector output.

2. In an impulse responsive switching system having at least three consecutive selecting stages, each of which stages has a plurality of groups of selector switches, and each selector switch has an input and a plurality of outputs, the improvement comprising: a route determining contact associated with the input of each selector of at least the final stage for indicating the busy condition of said selectors, and a controller circuit responsive to a plurality of impulses for setting up a connection, comprising: a routing selector connected to said route determining contacts responsive to the impulses preceding the ones used for setting said final selector corresponding to a desired final selector output, a finder means connected to the inputs of the selector switches of the first stage, and a testing device to determine by means of said routing selector which selector switches are already occupied and to pre-select one selector switch from said final selecting stage to which a circuit can be connected through said system for each call for a circuit detected by said finder means.

3. In an impulse responsive switching system having a plurality of incoming selector switches, a plurality of intermediate selector switches and a plurality of final selector switches, for connecting simultaneously a plurality of different circuits from said incoming selector switches to the desired ones of said final selector switches, each of said selector switches having an input and a plurality of outputs, the improvements comprising: X number of groups of incoming selector switches, Y number of groups of intermediate selector switches, each of which Y groups is divided into X parts and connected to a corresponding section of each of said incoming selector switches, and Z number of final selectors each having Y parts and connected to corresponding sections of each of said intermediate selector switches, and a controller circuit connected to the inputs of final selector switches for pre-selecting a final selector switch which is free and available for establishing a circuit through said system, said controller circuit being responsive to a plurality of impulses to set up a connection and including a routing selector responsive to the impulses preceding the ones used for setting the final selector switches and corresponding to the desired final selector output.

4. A system according to claim 3 wherein reserved sections are provided in each selector switch of at least one of the groups of selector switches preceding the group of said final selector switches.

5. A system according to claim 4 including additional final selector switches multipled to the selector switches known to have heavy traffic.

6. A system according to claim 4 wherein at least one section of said intermediate selectors is provided for heavy traffic groups of final selectors.

7. A system according to claim 4 wherein at least one section of said incoming selectors are connected directly to a plurality of final selectors for heavy traffic groups.

8. A system according to claim 4 wherein at least one section of each of the intermediate and incoming selectors is reserved for trunk circuits.

9. A system according to claim 4 wherein at least one section of at least one of the groups of selectors comprising the incoming and intermediate selectors is reserved for special services.

10. An impulse responsive switching system comprising: a first or incoming selecting stage, a number of intermediate selecting stages, a final selecting stage, each of said selecting stages being provided with selectors each having an inlet and a plurality of outlets; a controller circuit provided with a cord finder having a plurality of contacts and responsive to a plurality of said impulses for setting up a connection; a number of incoming lines each being connected to the inlet of an incoming selector as well as to a contact of said cord finder, the selectors of all selecting stages being divided into groups having conductors connecting the multipled outlets of each preceding selecting stage to the inlets of each of the groups of selectors of the following selecting stage; and switching means in said controller circuit connected to the inlets of said final selectors and responsive to the impulses preceding the ones used for setting said final selectors to pre-select a free and wanted final selector which may be reached by any incoming line via any group of selectors in which the intermediate selecting stages are divided.

11. In an automatic impulse responsive switching system comprising at least three stages of groups of selector switches having a first stage, an intermediate stage or stages, and a final stage of selectors, each of which selectors has an input and a plurality of outputs, the improvement comprising a controller circuit responsive to a plurality of impulses for setting up a connection comprising: a routing selector having an input and a plurality of output contacts and responsive to the impulses preceding the ones used for setting said final selectors, means connecting said routing selector output contacts to the inputs of said final selectors, and means connecting said input of said routing selector to the inputs of each of said groups of intermediate selectors, whereby said controller circuit pre-selects a free final selector to which said first and intermediate selectors must be routed.

12. In at least a four digit automatic switching system comprising at least three stages of groups of selector switches having a first stage, an intermediate stage or stages, and a final stage of selectors, each of which selectors has an input and a plurality of outputs, the inputs of the selectors of one stage being multipled to sections of the outputs of groups of selectors of a previous stage, the improvement comprising a controller circuit comprising: a routing selector having an input and a plurality of output contacts positioned by the first of the digits transmitted to said system, means connecting said routing selector output contacts to the multipled inputs of the final selectors of each group of final selectors, and means connecting the input of said routing selectors to the multipled groups of inputs of corresponding final selectors from each group of final selectors, whereby said controller circuit pre-selects a free final selector to which said first and intermediate selectors must be routed.

13. In an automatic switching system between a plurality of calling and called stations, having an incoming stage, an intermediate stage and a final stage of groups of selector switches, each selector switch having an input and a plurality of outputs, and said system also having a plurality of multipled output terminals of one group of selectors of a preceding stage being connected to the input terminals of at least one selector of each group of a following stage, the improvement comprising a controller circuit comprising: a first means for connecting said controller circuit to the input of any one of said selectors of said incoming stage, a second means for connecting said controller circuit to said inputs of at least said final selector switches in said final selector stage, and a routing selector in said controller circuit positioned according to the digits of the called station, whereby said controller circuit can pre-select the free selectors, one in each stage from said final stage back to said incoming stage, that are to be positioned for completing a connection through said system between a calling and called station.

14. A system according to claim 13 wherein said second means includes means for connecting said controller circuit to the selector switches of said intermediate stage.

15. In an automatic switching system between a plurality of calling and called stations having an incoming stage, an intermediate stage and a final stage of groups of selector switches to be positioned according to the digits corresponding to a called station, each selector switch having an input and a plurality of outputs, and said system having a plurality of multipled output terminals of one group of selectors of a preceding stage being connected to the input terminals of at least one selector of each group of a following stage, the improvement comprising a controller circuit comprising: a first means for connecting said controller circuit to the input of any one of the selectors of said incoming stage, a second means for connecting the controller circuit to said input of said final selector stage, and third means for connecting said controller circuit to said input of an intermediate selecting stage, and a routing selector in said controller circuit positioned according to the digits of the called station, whereby said controller circuit can preselect the free selectors, one in each stage from said final stage back to said incoming stage, and position said preselected free selectors in said intermediate stage corresponding to said digits for completing a connection through said system between a calling and a called station.

16. A switching system comprising: a first or incoming selecting stage, an intermediate selecting stage, and a final selecting stage, each of said selecting stages being provided with selectors each having an inlet and a plurality of outlets, said system having a selector in each stage to be positioned according to the digits of a called final selector outlet, a controller circuit provided with a cord finder having a plurality of contacts, a number of incoming lines each being connected to the inlet of an incoming selector as well as to a contact of said cord finder, groups of conductors connecting the selectors of all the selecting stages and dividing said selectors into multipled groups, the resulting multipled groups of selector outlets of each preceding selector stage being connected to the inlets of each of the groups of multipled selectors of the following selecting stage; a routing selector in said controller circuit, said routing selector comprising a number of sections, routing contacts associated with the inlets of each intermediate and final selector, means connecting corresponding sections of the routing selector with the routing contacts of the final selectors, and other means connecting other corresponding sections of the routing selector to the groups of routing contacts belonging to the intermediate selectors; and means in said controller circuit to position the routing selector corresponding to the transmission of digits over any incoming line via an engaged cord finder, whereby said first digits control the position of the intermediate selecting stages if a free junction circuit through said system is found, and the transmission of further digits effects the position of the final selector already selected by the routing selector out of the wanted group of final selectors.

17. A switching system comprising: a first or incoming selecting stage, an intermediate selecting stage, a final selecting stage, each of said selecting stages being provided with selectors each having an inlet and a plurality of outlets, and each of said inlets of said final selectors having also a two terminal routing contact; said system having a selector in each stage to be positioned according to the digits of a called final selector outlet; a controller circuit provided with a cord finder having a plurality of contacts and a routing selector having inputs and outputs, a number of incoming lines each being connected to a contact of said cord finder and to an inlet of an incoming selector; groups of conductors connecting and dividing each selecting stage into groups of multipled selectors, the multipled selector outlets of each preceding selecting stage being connected to the inlets of each of the groups of multipled selectors of the following selecting stage, said routing selector having a number of outputs equal to the number of groups of selectors in the final selecting stage with each outlet of said routing selector being connected in multiple to one terminal of the routing contacts of all the selectors in its corresponding group of final selectors, the respective inputs of said routing selector being connected in multiple to the other terminal of the routing contacts of a corresponding selector of each group of final selectors; a first means responsive to a first series of digits to be transmitted over any calling incoming line for setting said routing selector corresponding to said digits; a second means connected to the inputs of the routing selectors responsive to a combination of a free intermediate selector and a free final selector out of the wanted group, said second means thereupon controlling the selection of the incoming selector which hunts for said free combination of selectors; and a third means responsive to a second series of digits of said call to be transmitted over the calling incoming line for positioning said pre-selected free final selector out of the wanted group.

18. A switching system comprising: a first or incoming selecting stage provided with selectors having inlets and a plurality of outlets in contact banks; an intermediate selecting stage and a final selecting stage, each being provided with selectors each having a plurality of outlets in a contact bank, and each having an inlet having a wiper and a routing contact; said system having a selector in each stage to be positioned according to the digits of a called final selector outlet; a controller circuit provided with a routing device and a cord finder having a plurality of contacts; a number of incoming lines each being connected to a contact of said cord finder and to an inlet of an incoming selector, groups of conductors connecting and dividing each selecting stage into groups of multipled selectors, the multipled selector outlets of each preceding selecting stage being connected to inlets of each of the groups of multipled selectors of the following selecting stage; said routing device including first, second and third sections having separate wipers and contact banks, respectively, the contacts of said second and third contact banks being connected in multiple to routing contacts of said intermediate and said final selectors, respectively, said first section being positioned according to the first series of digits received over a calling incoming line to select the wanted group of final selectors, and a means connected between the first and second wipers of the routing device operative when said second and third sections finds a free intermediate selector which passes through a free final selector in the wanted group, to control the incoming selector which corresponds with the calling incoming line causing said incoming selector to hunt for the free junction circuit through said free intermediate selector which will connect with said free final selector found.

19. A digit responsive automatic switching system, comprising: a first or incoming selecting stage, an intermediate selecting stage, a final selecting stage, each of said selecting stages comprising groups of selectors, each selector having an inlet and a plurality of outlets and said inlets of said intermediate and final selectors also having a routing contact, groups of conductors connecting the outlets of each group of selectors of a preceeding selecting stage in multiple to the inlets of each of the groups of selectors in the following selecting stage, a cord finder each having a wiper and a plurality of contacts, a plurality of incoming lines each connected to the inlet of an incoming selector and to a contact of said cord finder, a controller circuit connected with a wiper of said cord finder, said controller circuit being provided with a switching path finder having marking, intermediate and final sections, said controller circuit also being provided with a routing selector having an inlet and a plurality of outlets, a coupling rectifier being connected in series with each routing contact of said final selectors, the routing contacts in each group of said final selectors being multipled to a corresponding outlet of the routing selector, and corresponding decoupling rectifiers from each said final groups being multipled to said final switching path finder section, additional conductors connecting series arrangements of the routing contacts of said intermediate selectors to said intermediate switching path finder section, means for electrically marking successive contacts of both an incoming selector and said marking section of said switching path finder, a first means for setting said routing selector in response to the first series of digits of a called line received over any calling incoming line to preselect the wanted group of final selectors corresponding to said called line, a second means connected between the inlet of said routing selector and the final section of said switching path finder, said second means being operative when said final and intermediate sections of said switching path finder finds a free intermediate selector passing through a free final selector out of the pre-selected group of final selectors, which second means thereby controls the incoming selector corresponding to the call, which incoming selector hunts for a free switching path, a third means connected between the wipers of the marking sections of both the switching path finder of the engaged controller circuit and the incoming selector, said third means being controlled by said incoming selector reaching the position connecting it to said free switching path, and a fourth means for positioning the resulting pre-selected and now engaged final selector in response to the second series of digits for said called line to be transmitted thereto over the calling incoming line.

20. A switching system according to claim 19 wherein said cord finder includes an additional switching means for connecting successive parts of said intermediate section of said switching path finder with corresponding groups of said incoming selectors.

21. In at least a four digit automatic switching system comprising at least three stages of groups of selector switches having a first stage, an intermediate stage or stages, and a final stage of selectors, each of which selectors has an input and a plurality of outputs, the inputs of the selectors of one stage being multipled to sections of the outputs of groups of selectors of a previous stage, the improvement comprising a controller circuit comprising: a routing selector having a plurality of inputs and a plurality of output contacts which selector is positioned by the first of the digits transmitted to said system, means connecting said routing selector contacts to the inputs of a group of final selectors, and means connecting the inputs of said routing selector to the multipled outputs of each of said groups of said first selectors, whereby said controller circuit preselects a free final selector to which said first and intermediate selectors must be routed.

22. A switching system comprising: a first or incoming selecting stage provided with selectors having inlets and a plurality of outlets in contact banks; an intermediate selecting stage and a final selecting stage, each being provided with selectors each having inlets and a plurality of outlets in a contact bank, the inlets of said selectors of said final selecting stage each having a wiper and a routing contact; said system having a selector in each stage to be positioned according to the digits of a called final selector outlet; a controller circuit provided with a routing device and a cord finder having a plurality of contacts; a number of incoming lines each being connected to a contact of said cord finder and to an inlet of an incoming selector, groups of conductors connecting and dividing each selecting stage into groups of multipled selectors, the multipled selector outlets of each preceeding selecting stage being connected to inlets of each of the groups of multipled selectors of the following selecting stage; said routing device including first, second and third sections having separate wipers and contact banks, respectively, the contacts of said second contact bank being connected in multiple to the routing contacts of said final selectors, respectively, means for moving the wipers of said second and said third sections jointly, said first section being positioned according to the first series of digits received over a calling incoming line to select the wanted group of final selectors and multipled routing contacts thereof, and a means connected between the first and second wipers of the routing device operative when said second section finds a free final selector in the wanted group, to control the incoming selector which corresponds with the calling incoming line dependent on the position taken by said wiper of said third section of said routing device causing said incoming selector to hunt for the free junction circuit through a free intermediate selector which will connect with said final selector found.

References Cited in the file of this patent

UNITED STATES PATENTS

| | | |
|---|---|---|
| 1,559,736 | Bellamy et al. | Nov. 3, 1925 |
| 2,129,011 | Lamberty | Sept. 6, 1938 |
| 2,252,856 | Lubberger | Aug. 19, 1941 |
| 2,326,458 | Hall | Aug. 10, 1943 |
| 2,363,671 | Hubbard | Nov. 28, 1944 |
| 2,529,166 | Lesigne | Nov. 7, 1950 |
| 2,629,019 | Lesigne | Feb. 17, 1953 |